UNITED STATES PATENT OFFICE.

HEINRICH BAUM, OF MANNHEIM, GERMANY.

PROCESS OF MAKING PYROSULPHATES.

SPECIFICATION forming part of Letters Patent No. 373,264, dated November 15, 1887.

Application filed April 13, 1887. Serial No. 234,688. (No specimens.)

*To all whom it may concern:*

Be it known that I, HEINRICH BAUM, a subject of the Emperor of Germany, and resident at Mannheim, in the Empire of Germany, have invented new and useful Improvements in the Manufacture of Pyrosulphates, of which the following is a specification.

The pyrosulphuric salts of the metals, and especially of the alkali metals, $(S_2O_7R_2,)$ have been hitherto obtained either by Berzelius's method—viz., heating the acid sulphates at a brown heat—or by the action of a molecule of $SO_3$ upon neutral sulphates, (R. Weber, Berlin, Berichte, Vol. 17, page 2,498, and H. Schulze, page 27,056.) Owing to its expense, the latter method is scarcely practicable for the commercial production of pyrosulphates, while the former method possesses the serious drawback that a part of the pyrosulphate formed at the high temperature of brown heat almost always decomposes, evolving $SO_3$. Only an inferior product is obtained by this means when carried out on a large scale, added to which the open cast-iron melting-vessels at the high temperature become very quickly destroyed.

I have discovered that the acid sulphates—*i. e.*, those of the alkalies and of ammonia, or molecular mixtures of neutral sulphates with $H_2SO_4$ *in vacuo*—become converted at a comparatively low temperature (260° to 320° centigrade) into pyrosulphates and liberate water without the formation of the slightest trace of $SO_3$. At these low temperatures the operation may be performed in cast-iron vessels without fear of their being attacked, while the gain in practice corresponds to the gain in theory.

The following is the mode of manufacture: To manufacture sodium pyrosulphate I introduce two hundred and forty kilos acid sulphate of sodium, or one hundred and forty-two kilos neutral sodium sulphate and ninety-eight kilos sulphuric acid (hydrate) at 66° Baumé, into a cast-iron retort provided with a stirring arrangement. The retort is connected with an air-pump and heated while exhausting to 260° centigrade. In the course of from five to eight hours the mass is heated while stirring to 300° to 320° centigrade. The greater part of the water formed passes off at 260° to 280° centigrade, (under a vacuum of fifty to sixty centimeters of mercury,) the temperature being only raised to 320° centigrade to insure the completion of the reaction. The fused mass is then cast in plates, and consists of pure sodium pyrosulphate.

Pyrosulphates of the other alkali metals, as well as of ammonia, may be produced in precisely the same way.

In carrying out this invention it is desirable to introduce between the stirring-vessel and air-pump a condenser and receiver connected by a glass tube, so that the point of completion of the reaction can be readily ascertained, the fusion being complete as soon as water is no longer to be detected in the glass tube.

Having thus described my invention and the manner of employing the same, what I claim, and wish to have secured by Letters Patent of the United States of America, is—

The process of making pyrosulphates of the alkali metals, as also of ammonia, by heating the acid sulphates thereof in a vacuum to temperatures below brown heat, or between 200° and 400° centigrade.

In testimony whereof I have signed my name to this specification in the presence of two subscribing witnesses.

HEINRICH BAUM.

Witnesses:
FRANZ HASSLACHER,
JOSEPH PATRICK.